3,763,146
NOVEL 17β-(TETRAHYDROPYRAN-4-YLOXY) STEROIDS
John A. Edwards, Los Altos, Calif., assignor to Syntex Corporation, Panama, Panama
No Drawing. Continuation-in-part of application Ser. No. 135,757, Apr. 20, 1971. This application Feb. 3, 1972, Ser. No. 223,339
Int. Cl. C07c 173/00
U.S. Cl. 260—239.55 R  7 Claims

ABSTRACT OF THE DISCLOSURE

Novel 17β-(tetrahydropyran-4-yloxy) steroid ethers are disclosed. Specifically, 17β - (tetrahydropyran - 4 - yloxy) ethers of androstane and estrane series are disclosed together with a method for their preparation and a discussion of their unexpected biological activity, inter alia, as anabolic/androgenic and estrogenic/antifertility agents.

---

This is a continuation-in-part of application Ser. No. 135,757, filed Apr. 20, 1971.

The present invention relates to novel steroid ethers. More particularly, the present invention is related to steroid ethers of the androstane and estrane series in which the novel tetrahydropyran-4-yloxy ether grouping is attached at the C–17β position and can be depicted by the following formula:

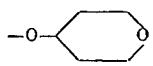

The novel compounds of the present invention bearing said novel group can be further represented by the following structural formulas:

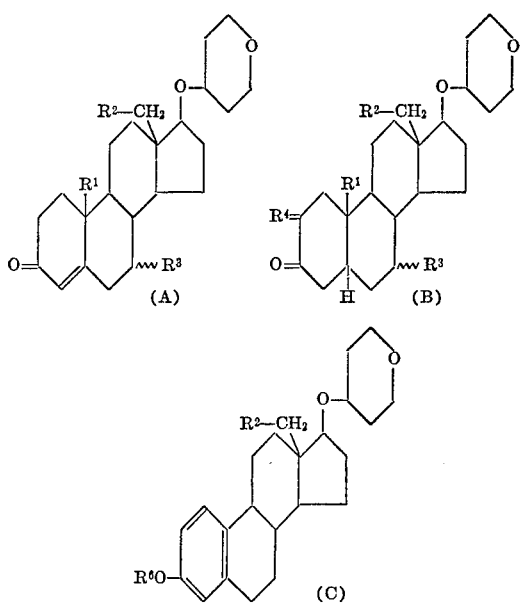

In the above and succeeding formulas:

$R^1$ is hydrogen or methyl;
$R^2$ is hydrogen, methyl, or ethyl;
$R^3$ is hydrogen, α-methyl, or β-methyl;
$R^4$ is hydroxymethylene or the group $$R^5\text{....}\overset{H}{|}$$

in which $R^5$ is hydrogen or methyl; and
$R^6$ is hydrogen, hydrocarbon carboxylic acyl of less than twelve carbon atoms, or alkyl of one to eight carbon atoms.

Thus included within the scope of the novel compounds of the present invention are the following:

17β-(tetrahydropyran-4-yloxy)-estr-4-en-3-one;
17β-(tetrahydropyran-4-yloxy)-androst-4-en-3-one;
7α-methyl-17β-(tetrahydropyran-4-yloxy)-estr-4-en-3-one;
7β-methyl-17β-(tetrahydropyran-4-yloxy)-estr-4-en-3-one;
7α-methyl-17β-(tetrahydropyran-4-yloxy)-androst-4-en-3-one;
7β-methyl-17β-(tetrahydropyran-4-yloxy)-androst-4-en-3-one;

and the corresponding 18-methyl and 18-ethyl compounds thereof;

17β-(tetrahydropyran-4-yloxy)-5α-estran-3-one;
17β-(tetrahydropyran-4-yloxy)-5α-androstan-3-one;
7α-methyl-17β-(tetrahydropyran-4-yloxy)-5α-estran-3-one;
7β-methyl-17β-(tetrahydropyran-4-yloxy)-5α-estran-3-one;
7α-methyl-17β-(tetrahydropyran-4-yloxy)-5α-androstan-3-one;
7β-methyl-17β-(tetrahydropyran-4-yloxy)-5α-androstan-3-one;

and the corresponding 18-methyl and 18-ethyl compounds thereof;

2α-methyl-17β-(tetrahydropyran-4-yloxy)-5α-estran-3-one;
2α-methyl-17β-(tetrahydropyran-4-yloxy)-5α-androstan-3-one;
2-hydroxymethylene-17β-(tetrahydropyran-4-yloxy)-5α-estran-3-one;
2-hydroxymethylene-17β-(tetrahydropyran-4-yloxy)-5α-androstan-2-one;

and the corresponding 7α-methyl, 7β-methyl, 18-methyl, 18-ethyl, 7α,18-dimethyl, 7α-methyl-18-ethyl, 7β,18-dimethyl, and 7β-methyl-18-ethyl compounds thereof;

17β-(tetrahydropyran-4-yloxy)-estra-1,3,5(10)-trien-3-ol;
3-methoxy-17β-(tetrahydropyran-4-yloxy)-estra-1,3,5(10)-triene;
3-acetoxy-17β-(tetrahydropyran-4-yloxy)-estra-1,3,5(10)-triene;
3-benzoyloxy-17β-(tetrahydropyran-4-yloxy)-estra-1,3,5(10)-triene;

and the 18-methyl and 18-ethyl compounds thereof.

Particularly valuable compounds hereof are 17β-(tetrahydropyran - 4 - yloxy)-androst-4-en-3-one, 17β-(tetrahydropyran-4-yloxy)-5α-androstan-3-one, and 17β-(tetrahydropyran-4-yloxy)-estra-1,3,5(10)-trien-3-ol.

The compounds of the present invention of Formulas A and B exhibit high anabolic and androgenic activity and are thus useful for those purposes for which such activity is indicated, for example, in treatment to enhance weight gain and in the treatment of debilitated patients, particularly those recovering in post-operative care. They can also be used in the treatment of male climacteric and dismenorrhea in the female. The compounds of the present invention of Formula C exhibit high oral estrogenic and antifertility activity and are useful for the purposes for which such activity is indicated, for example, in the treatment of perimenopausal conditions and the control and regulation of fertility. These compounds can be employed in the same manner as steroid compounds having similar activity, such as oxymetholone, norethandrolone, dromostanolone, testosterone propionate, mestranol, estradiol, conjugated estrogens, etc., and provide the benefits and advantages of oral administration because of their high oral activities.

The prior art has reported certain related steroid ethers including 17β-(tetrahydropyran-2-yloxy)-androst-4-en-3-one, 17β-(tetrahydropyran-2-yloxy)-5α-androstan-3-one, and 17β-(tetrahydropyran-2-yloxy)-estra-1,3,5(10)-trien-3-ol.

Now it has been discovered that the compounds of the present invention possess unexpected and unobvious anabolic and androgenic and estrogenic and anti-fertility activity which is superior to that exhibited by compounds of the closest prior art. Thus, standard tests were conducted for anabolic/androgenic activity which are modifications of the basic methods described by Hershberger et al., Proc. Soc. Expt. Biol. Med. 83, 175 (1953) and by Dorfman, "Methods in Hormone Research," Academy Press, N.Y. (1962), p. 306 of vol. II. These tests demonstrated that 17β-(tetrahydropyran-4-yloxy)-androst-4-en-3-one has equal to or greater than three times the androgenic activity of 17β-(tetrahydropyran-2-yloxy)-androst-4-en-3-one. This is of particular importance when treatment requiring high androgenic activity is indicated. Similarly, these tests demonstrated that 17β-(tetrahydropyran-4-yloxy)-5α-androstan-3-one has greater than four times the anabolic activity and two times the androgenic activity of 17β-(tetrahydropyran-2-yloxy)-5α-androstan-3-one. This is significant when treatment requiring either or both anabolic and androgenic activity is/are indicated.

Standard tests were conducted for estrogenic and anti-fertility activity. These tests demonstrated that 17β-(tetrahydropyran-4-yloxy)-estra-1,3,5(10)-trien-3-ol has about two times the oral estrogenic activity of, at least four times the prolonged oral estrogenic activity of, and up to four times the oral anti-fertility activity of 17β-(tetrahydropyran-2-yloxy)-estra-1,3,5(10)-trien-3-ol. This is significant when treatment requiring high or prolonged estrogenic and anti-fertility activity is indicated.

The compounds of the present invention have thus been shown to be unexpectedly biologically superior to the compounds of the prior art because they possess androgenic and/or anabolic or estrogenic and/or anti-fertility activity far in excess of that which could be predicted.

In addition, it has been surprisingly discovered that the compounds of the present invention, in contrast to the ethers of the prior art, are stable to hydrolysis conditions such as those which are encountered in the animal stomach. The suitability for oral administrations of the compounds is thus enhanced.

The compounds of the present invention are prepared directly by treating the corresponding 17β-hydroxy starting compound with a 4-halotetrahydropyran in organic liquid reaction media, such as benzene, glyme, and dimethylformamide at a temperature of from about 50° C. to about the reflux temperature of the solvent and with the use of sodium or lithium hydride, silver oxide, etc.

Alternatively, 3-keto-Δ⁴-17β-ol starting compounds are treated with 4-methoxy-5,6-dihydro-2H-pyran in the presence of acid to give the corresponding 17β-(4-methoxy-tetrahydropyran-4-yloxy) compound. This is then treated with acid anhydride or acyl chloride in the presence of sodium methoxide in dimethyl sulfoxide. The resultant 3-acetoxy-Δ³,⁵ compound is then reduced such as with sodium borohydride to give the corresponding 3-hydroxy-Δ⁵ compound. This compound is then treated with lithium aluminum hydride/aluminum chloride to give the corresponding 3β-hydroxy-17β-(tetrahydropyran-4-yloxy) - Δ⁵ compound. These compounds are then converted to the corresponding 3-keto-Δ⁴ compounds hereof under Oppenaurer conditions which are converted to the corresponding 5α compounds hereof under Birch conditions. The Δ⁵-3-ol are converted to the corresponding 5α compounds by palladium-on-charcoal hydrogenation. The corresponding 2-hydroxymethylene-3-keto-5α compounds (prepared by treating the 3-keto-5α compounds with ethyl formate in base) are hydrogenated to prepare the corresponding 2α-methyl-3-keto-5α compounds.

In the Ring A aromatic series, the lithium aluminum hydride/aluminum chloride or 4-halotetrahydropyran reactions are conducted on the 3-alkoxy ether starting compounds ore the 3-hydroxy starting compounds followed by conventional esterification of the latter, if desired.

The starting compounds of the present invention can be selected from the estrane ($R^1$=H) or androstane ($R^1$=methyl) series. The starting compounds can further be of the normal ($R^2$=H) or C–18 substituted ($R^2$=methyl or ethyl) series. Similarly, the starting compounds of the present invention can bear a 7α-methyl or 7β-methyl group ($R^3$). If desired, 2α-methyl-3-keto-5α-estrane and androstane compounds can be employed as starting materials with introduction of the C–17β novel ether grouping herein conducted as described above.

By the term "alkyl" is meant a monovalent aliphatic saturated hydrocarbon group of one to eight carbon atoms, i.e., methyl, ethyl, n-propyl, isopropyl, n-butyl, isobutyl, sec-butyl, t-butyl, n-pentyl, isopentyl, hexyl, heptyl, octyl, and the various isomers thereof. By the term "hydrocarbon carboxylic acyl" is meant an acyl group derived from a substituted or unsubstituted (hydrocarbon) carboxylic acid. These acids can be completely saturated or possess varying degrees of unsaturation (including aromatic), can be of straight chain, branched chain, or cyclic structure, and preferably contain from one to twelve carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical acyl groups include acetyl, propionyl, butyryl, trimethylacetyl, valeryl, methylethylacetyl, caproyl, t-butylacetyl, decanoyl, undecanoyl, benzoyl, phenylacetyl, diphenylacetyl, cyclopentylpropionyl, methoxyacetyl, aminoacetyl, diethylaminoacetyl, trichloroacetyl, β-chloropropionyl, adamantoyl, and the like.

The following examples further illustrate the method by which the present invention can be practiced.

EXAMPLE 1

Ten g. of 3-acetoxyandrost-5-en-17β-ol in 150 ml. of ether and 150 mg. of p-toluenesulfonic acid (dried by azeotropic distillation from benzene) are mixed together and the reaction mixture is treated with 4-methoxy-5,6-dihydro-2H-pyran, 1 ml. at a time until reaction is complete (followed by TLC). The reaction is quenched by addition of 0.5 ml. of triethylamine, washed with water, and crystallized with care from methanol containing pyridine to give 3-acetoxy-17β-(4-methoxytetrahydropyran-4-yloxy)-androst-5-ene.

A solution of 14 g. of aluminum chloride in 250 ml. dry ether is treated with a solution of 4 g. of lithium aluminum hydride in 100 ml. of ether. 3-acetoxy-17β-(4-methoxytetrahydropyran-4-yloxy)-androst-5-ene (1.5 g.) is extracted into the solution. An additional 7 g. of steroid is extracted into the lithium aluminium hydride solution. After reduction is complete (monitored by TLC), saturated sodium chloride is added until a precipitate forms. This is filtered and the crude product purified by chromatography on silica gel to yield 17β-(tetrahydropyran-4-yloxy)-androst-5-en-3β-ol.

Two hundred mg. of 17β-(tetrahydropyran-4-yloxy)-androst-5-en-3β-ol in 25 ml. of toluene containing 1 ml. of cyclohexanone is distilled briefly to remove moisture. Freshly distilled aluminum isopropoxide (200 mg.) is added and the mixture is refluxed for 18 hours. The product is isolated by steam distillation, extraction and chromatography to yield 17β-(tetrahydropyran-4-yloxy)-androst-4-en-3-one.

EXAMPLE 2

Ten g. of androst-4-en-17β-ol-3-one in 150 ml. of ether and 150 mg. of p-toluenesulfonic acid (dried by azeotropic distillation from benzene) are mixed together and the reaction mixture is treated with 4-methoxy-5,6-dihydro-2H-pyran, 1 ml. at a time until reaction is complete (followed by TLC). The reaction is quenched by addition of 0.5 ml. of triethylamine, washed with water and crystallized with care from methanol containing pyridine to give 17β-(4-methoxytetrahydropyran-4-yloxy)-androst-4-en-3-one.

The 17β-(4-methoxytetrahydropyran-4-yloxy)-androst-4-en-3-one (2 g.) is dissolved in 20 ml. of dry dimethyl sulfoxide and the solution is heated with one molar equivalent of sodium methoxide under nitrogen at 5 to 10° C. After 20 minutes, there is added one molar equivalent of acetic anhydride or acetyl chloride. After one hour, saturated brine is added and the precipitate of 3-acetoxy-17β-(4 - methoxytetrahydropyran-4-yloxy)-androsta-3,5-diene is collected, washed with water and carefully dried.

Alternatively, 17β-(4 - methoxytetrahydropyran-4-yloxy)-androst-4-en-3-one (2 g.) is dissolved in tetrahydrofuran (25 ml.) containing 1.2 equivalents of pure potassium 5-butoxide. After 20 minutes there is added one molar equivalent of acetic anhydride or acetyl chloride (neat or dissolved in 10 ml. of tetrahydropyran). After one hour, saturated brine (250 ml.) is added and the 3-acetoxy-17β-(4 - methoxytetrahydropyran-4-yloxy)-androsta-3,5-diene is isolated by extraction with ethyl acetate.

Twenty g. of acetoxy-17β-(4-methoxytetrahydropyran-4-yloxy)-androsta-3,5-diene in 150 ml. of dioxane is reduced by the addition of sodium borohydride in aqueous dioxane until the reaction is complete. The mixture is poured onto a little dilute hydrogen chloride and ice, filtered, washed to neutral, dried, and recrystallized from methanol to yield 17β-(4 - methoxytetrahydropyran-4-yloxy)-androst-5-en-3β-ol.

A solution of 14 g. of aluminum chloride in 250 ml. of dry ether is treated with a solution of 4 g. of lithium aluminum hydride in 100 ml. of ether. 17β-(4-methoxytetrahydropyran-4-yloxy)-androst-5-en-3β-ol (1.5 g.) is extracted into the solution. An additional 7 g. of steroid is extracted into the lithium aluminum hydride solution. After reduction is complete (monitored by TLC), saturated sodium chloride is added until a precipitate forms. This is filtered and the crude product purified by chromatography on silica gel to yield 17β-(tetrahydropyran-4-yloxy)-androst-5-en-3β-ol.

Two hundred mg. of 17β-(tetrahydropyran-4-yloxy)-androst-5-en-3β-ol in 25 ml. of toluene containing 1 ml. of cyclohexanone is distilled briefly to remove moisture. Freshly distilled aluminum isopropoxide (200 mg.) is added and the mixture is refluxed for 18 hours. The product is isolated by steam distillation, extraction and chromatography to yield 17β-(tetrahydropyran-4-yloxy)-androst-4-en-3-one.

The other 3-keto compounds of the present invention bearing a novel 17β-(tetrahydropyran-4-yloxy) ether grouping can be prepared from the corresponding starting materials. Thus, for example, there are prepared 17β-(tetrahydropyran-4-yloxy)-estr-4-en-3-one,
7α-methyl-17β-(tetrahydropyran-4-yloxy)-estr-4-en-3-one,
7β-methyl-17β-(tetrahydropyran-4-yloxy)-estr-4-en-3-one,
7α-methyl-17β-(tetrahydropyran-4-yloxy)-androst-4-en-3-one,
7β-methyl-17β-(tetrahydropyran-4-yloxy)-androst-4-en-3-one,
17β-(tetrahydropyran-4-yloxy)-18-methylestra-4-en-3-one,
17β-(tetrahydropyran-4-yloxy)-18-methylandrost-4-en-3-one,
7α-methyl-17β-(tetrahydropyran-4-yloxy)-18-methyl-androst-4-en-3-one,
7α-methyl-17β-(tetrahydropyran-4-yloxy)-18-methyl-estr-4-en-3-one,
7β-methyl-17β-(tetrahydropyran-4-yloxy)-18-methyl-estr-4-en-3-one, and
7β-methyl-17β-(tetrahydropyran-4-yloxy)-18-methyl-androst-4-en-3-one.

EXAMPLE 3

To a solution of 1 g. of 17β-(tetrahydropyran-4-yloxy)-androst-4-en-3-one in 75 ml. of tetrahydrofuran and 125 ml. of liquid ammonia is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17β-(tetrahydropyran-4-yloxy)-5α-androstan-3-one which may be further purified through recrystallization from ether:hexane.

In a similar manner, the compounds prepared as described in Examples 1 and 2 above are thus treated to prepare the corresponding 3-keto-5α-compounds:

17β-(tetrahydropyran-4-yloxy)-5α-estran-3-one,
7α-methyl-17β-(tetrahydropyran-4-yloxy)-5α-estran-3-one,
7β-methyl-17β-(tetrahydropyran-4-yloxy)-5α-estran-3-one,
7α-methyl-17β-(tetrahydropyran-4-yloxy)-5α-androstan-3-one,
7β-methyl-17β-(tetrahydropyran-4-yloxy)-5α-androstan-3-one,
17β-(tetrahydropyran-4-yloxy)-18-methyl-5α-estran-3-one,
17β-(tetrahydropyran-4-yloxy)-18-methyl-5α-androstan-3-one.
7α-methyl-17β-(tetrahydropyran-4-yloxy)-18-methyl-5α-androstan-3-one,
7α-methyl-17β-(tetrahydropyran-4-yloxy)-18-methyl-5α-estran-3-one,
7β-methyl-17β-(tetrahydropyran-4-yloxy)-18-methyl-5α-estran-3-one, and
7β-methyl-17β-(tetrahydropyran-4-yloxy)-18-methyl-5α-androstan-3-one.

EXAMPLE 4

To a stirred solution of 3 g. of 17β-(tetrahydropyran-4-yloxy)-5α-androstan-3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene - 17β - (tetrahydropyran - 4 - yloxy)-5α-androstan-3-one which is recrystallized from methylene chloride:hexane.

In a similar manner, the corresponding 2-hydroxymethylene compounds of the other compounds prepared as set forth in Example 3 can be prepared, for example, 2-hydroxymethylene-17β-(tetrahydropyran-4-yloxy)-5α-estran-3-one,
2-hydroxymethylene-7α-methyl-17β-(tetrahydropyran-4-yloxy)-5α-estran-3-one,
2-hydroxymethylene-7β-methyl-17β-(tetrahydropyran-4-yloxy)-5α-estran-3-one,
2-hydroxymethylene-7α-methyl-17β-(tetrahydropyran-4-yloxy)5α-androstan-3-one,
2-hydroxymethylene-7β-methyl-17β-(tetrahydropyran-4-yloxy)-5α-androstan-3-one, 2-hydroxymethylene-17β-(tetrahydropyran-4-yloxy)-18-methyl-5α-estran-3-one,
2-hydroxymethylene-17β-(tetrahydropyran-4-yloxy)-18-methyl-5α-androstan-3-one,
2-hydroxymethylene-7α-methyl-17β-(tetrahydropyran-4-yloxy)-18-methyl-5α-androstan-3-one,
2-hydroxymethylene-7α-methyl-17β-(tetrahydropyran-4-yloxy)-18-methyl-5α-estran-3-one,
2-hydroxymethylene-7β-methyl-17β-(tetrahydropyran-4-yloxy)-18-methyl-5α-estran-3-one, and
2-hydroxymethylene-7β-methyl-17β-(tetrahydropyran-4-yloxy)-18-methyl-5α-androstan-3-one.

EXAMPLE 5

A mixture of 5 g. of 17β-(tetrahydropyran-4-yloxy)-5α-androstan-3-one in 40 ml. of anhydrous thiophene-free benzene, 2 ml. of ethyl formate and 1.5 g. of sodium hydride is stirred for eight hours under nitrogen. The solid which forms is collected by filtration, washed with benzene and then hexane and dried in vacuo. This material is then cautiously added in portions to excess ice-cold dilute hydrochloric acid with stirring. The solid which forms is collected by filtration, washed with water and air dried. One gram of the product in 15 ml. of methanol is hydrogenated with 0.4 g. of prehydrogenated 10% palladium carbon catalyst at 25° C. atmospheric pressure until two moles of hydrogen are absorbed. The mixture is then filtered, the catalyst is washed with hot methanol and the combined solutions are evaporated to dryness to yield 2α-methyl-17β-(tetrahydropyran-4-yloxy)-5α-androstan-3-one.

In a similar manner, the compounds prepared as described in Example 3 above can be converted to the corresponding 2α-methyl compounds, for example, 2α-methyl-17β-(tetrahydropyran-4-yloxy)-5α-estran-3-one,
2α,7α-dimethyl-17β-(tetrahydropyran-4-yloxy)-5α-estran-3-one,
2α,7β-dimethyl-17β-(tetrahydropyran-4-yloxy)-5α-estran-3-one,
2α,7α-dimethyl-17β-(tetrahydropyran-4-yloxy)-5α-androstan-3-one,
2α,7β-dimethyl-17β-(tetrahydropyran-4-yloxy)-5α-androstan-3-one,
2α-methyl-17β-(tetrahydropyran-4-yloxy)-18-methyl-5α-estran-3-one,
2α-methyl-17β-(tetrahydropyran-4-yloxy)-18-methyl-5α-androstan-3-one,
2α,7α-dimethyl-17β-(tetrahydropyran-4-yloxy)-18-methyl-5α-androstan-3-one,
2α,7α-dimethyl-17β-(tetrahydropyran-4-yloxy)-18-methyl-5α-estran-3-one,
2α,7β-dimethyl-17β-(tetrahydropyran-4-yloxy)-18-methyl-5α-estran-3-one, and
2α,7β-dimethyl-17β-(tetrahydropyran-4-yloxy)-18-methyl-5α-androstan-3-one.

EXAMPLE 6

A solution of 3 g. of 2-hydroxymethylene-17β-(tetrahydropyran-4-yloxy)-5α-androstan-3-one in 125 ml. of dioxane is hydrogenated at 25° C./570 mm. with 0.5 g. of prehydrogenated 10% palladium-on-charcoal. Upon the consumption of the theoretical amount of hydrogen, the solution is filtered and the filtrate evaporated to dryness under reduced pressure to yield 2α-methyl-17β-(tetrahydropyran-4-yloxy)-5α-androstan-3-one which is recrystallized from acetone.

In a similar manner, the products of the procedure of Example 4 above can be converted to the corresponding 2α-methyl compounds.

EXAMPLE 7

Ten g. of 3-acetoxyestra-1,3,5(10)-trien-17β-ol in 150 ml. of ether and 150 mg. of p-toluenesulfonic acid (dried by azeotropic distillation from benzene) are mixed together and the reaction mixture is treated with 4-methoxy-5,6-dihydro-2H-pyran, 1 ml. at a time until reaction is complete (followed by TLC). The reaction is quenched by addition of 0.5 ml. of triethylamine, washed with water, and crystallized with care from methanol containing pyridine to give 3-acetoxy-17β-(4-methoxytetrahydropyran-4-yloxy)-estra-1,3,5(10)-triene.

A solution of 14 g. of aluminum chloride in 250 ml. dry ether is treated with a solution of 4 g. of lithium aluminum hydride in 100 ml. of ether. 3-acetoxy-17β-(4 - methoxytetrahydropyran - 4 - yloxy) - estra-1,3,5(10)-triene (1.5 g.) is extracted into the solution. An additional 7 g. of steroid is extracted into the lithium aluminum hydride solution. After reduction is complete (monitored by TLC), saturated sodium chloride is added until a precipitate forms. This is filtered and the crude product purified by chromatography on silica gel to yield 17β-(tetrahydropyran-4-yloxy)-estra-1,3,5(10)-trien-3-ol.

Alternatively, a solution of 100 mg. of lithium aluminum hydride in ether is added to a solution of 1.2 g. of aluminum chloride in ether and cooled in ice. The resultant solution is stirred at room temperature for one hour and then 200 mg. of 3-acetoxy-17β-(4-methoxytetrahydropyran-4-yloxy)-estra - 1,3,5(10) - triene are added. The solution is refluxed for two hours (followed by TLC). The solution is then chromatographed with ether:hexane to give 17β-(tetrahydropyran-4-yloxy)-estra-1,3,5(10) - trien-3-ol which can be recrystallized from methanol.

In like manner 17β-(tetrahydropyran - 4 - yloxy)-18-methyl - estra-1,3,5(10)-trien-3-ol, 3-methoxy-17β-(tetrahydropyran - 4 - yloxy)-estra-1,3,5(10)-triene, 3-methoxy-17β-(tetrahydropyran - 4 - yloxy)-18-methyl-estra-1,3,5-(10)-triene, 3 - ethoxy - 17β-(tetrahydropyran-4-yloxy)-estra-1,3,5(10)-triene, and 3-ethoxy - 17β - (tetrahydropyran-4-yloxy) - 18 - methyl-estra-1,3,5(10)-triene is each prepared from the respective starting compound, the 3-ol compound first mentioned being obtained as described above starting with the, e.g. 3-acetate compound.

EXAMPLE 8

A mixture of 2 g. of 17β-(tetrahydropyran-4-yloxy)-estra-1,3,5(10)-trien-3-ol in 8 ml. of pyridine and 4 ml. of benzoyl chloride is heated at steam bath temperature for one hour. The mixture is then poured into ice water and the solid which forms is collected by filtration, washed with water and dried to yield 3-benzoyloxy-17β-(tetrahydropyran-4-yloxy)-triene which is further purified through recrystallization from methylene chloride:hexane.

In like manner, 3-acetoxy-17β-(tetrahydropyran-4-yloxy)-estra-1,3,5(10)-triene is prepared using acetyl chloride. The other hydrocarbon carboxylic acyl compounds are also thus prepared, using the appropriate acyl chloride. Similarly, 3-acetoxy-17β- (tetrahydropyran-4-yloxy)-18-methyl-estra-1,3,5(10) - triene and 3-benzoyloxy-17β-(tetrahydropyran-4-yloxy)-18 - methylestra - 1,3,5(10)-triene are prepared.

EXAMPLE 9

A suspension of 0.5 g. of 5% palladium-on-carbon catalyst in 50 ml. of methanol is hydrogenated for 30 minutes. A solution of 2 g. of 17β-(tetrahydropyran-4-yloxy)-androst-5-en-3β-ol in 200 ml. of methanol is added and hydrogenated with agitation until the uptake of hydrogen has ceased. The catalyst is removed by filtration and the solution evaporated to yield 17β-(tetrahydropyran-4-yloxy)-5α-androstan-3β-ol which is recrystallized from methylene chloride:hexane for further purification.

To a stirred solution of 1 g. of 17β-(tetrahydropyran-4-yloxy)-5α-androstan-3β-ol in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0-5° C. and diluted with water. The solid which forms is collected by filtration, washed with water and dried under vacuum to yield 17β-(tetrahydropyran-4-yloxy)-5α-androstan-3-one which may be further purified by recrystallization from acetone:hexane.

EXAMPLE 10

A mixture of 1 g. of 5α-androstan-17β-ol-3-one and 5 g. of 4-iodotetrahydropyran in 25 ml. of benzene is distilled under nitrogen to remove moisture. Three g. of silver carbonate are then added and the mixture refluxed for 3 hours. The mixture is then chromatographed (7:1 hexane:ethyl acetate) over silica gel to give 17β-(tetrahydropyran-4-yloxy)-5α-androstan-3-one.

EXAMPLE 11

Forty g. of 3β-acetoxyandrost-5-en-17-one in 1.4 l. of ethanol is hydrogenated with 5 g. of 10% palladium-on-charcoal to yield 3β-acetoxy-5α-androstan-17-one.

3β-acetoxy-5α-androstan-17-one (25 g.) in 300 ml. of dioxane and 10% water is cooled to 0° C. Sodium borohydride (ca. 3 g.) is added. After the reduction is complete, the mixture is poured into water, ice and dilute hydrogen chloride. The resultant mixture is filtered and crystallized from benzene:hexane to yield 3β-acetoxy-5α-androstan-17β-ol.

3β-acetoxy-5α-androstan-17β-ol (14 g.) is dispersed in 150 ml. of ether. P-toluenesulfonic acid (100 mg.) in benzene (dried azeotropically) is added to the solution. 4-methoxy-5,6-dihydro-2H-pyran is added 1 ml. at a time over 6 hours. The mixture is quenched with triethylamine. Filtration crystallizes 3β-acetoxy-17β-(4-methoxytetrahydropyran-4-yloxy)-5α-androstane.

Hydrolysis with potassium hydroxide in methanol gives 17β-(4-methoxytetrahydropyran-4-yloxy) - 5α-androstan-3β-ol. This compound is treated with aluminum chloride:lithium aluminum hydride, as described above, to give 17β-(tetrahydropyran-4-yloxy)-5α-androstan-3β-ol which is oxidized (Jones), as described above, to give 17β-(tetrahydropyran-4-yloxy)-5α-androstan-3-one.

EXAMPLE 12

A mixture of 2 grams of estra-1,3,5(10)-trien-3-ol-17-one in 8 ml. of pyridine and 4 ml. of acetyl chloride is heated at steam bath temperatures for one hour. The mixture is then poured into ice water and the solid which forms is collected by filtration, washed with water and dried to yield 3-acetoxyestra-1,3,5(10)-trien-17-one which is further purified through recrystallization from methylene chloride:hexane.

A solution of 2 g. of 3-acetoxyestra-1,3,5(10)-trien-17-one in 20 ml. of anhydrous tetrahydrofuran is cooled to —75° C. in a Dry Ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 3-acetoxyestra-1,3,5(10)trien-17β-ol.

Similarly prepared are 3-acetoxy-18-methylestra-1,3,5(10)-trien-17β-ol and 3-acetoxy-18-ethylestra-1,3,5(10)-triene-17β-ol. The thus-prepared compounds are useful as described in Example 7.

What is claimed is:

1. A compound selected from the group of compounds represented by the following formula:

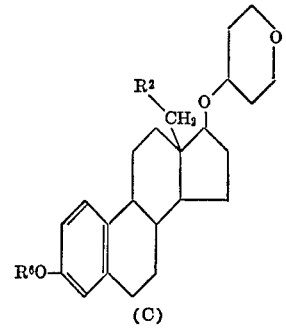

(C)

wherein $R^2$ is hydrogen, methyl, or ethyl; and $R^6$ is hydrogen, hydrocarbon carboxylic acyl of less than twelve carbon atoms, or alkyl of one to eight carbon atoms.

2. A compound selected from those of claim 1 wherein $R^2$ is methyl.

3. A compound selected from those of claim 1 wherein $R^2$ is hydrogen.

4. The compound selected from those of claim 3 wherein $R^6$ is hydrogen; 17β-(tetrahydropyran-4-yloxy)-estra-1,3,5(10)-trien-3-ol.

5. The compound selected from those of claim 3 wherein $R^6$ is acetyl; 3-acetoxy-17β-(tetrahydropyran-4-yloxy)-estra-1,3,5(10)-triene.

6. The compound selected from those of claim 3 wherein $R^6$ is benzoyl; 3-benzoyloxy-17β-(tetrahydropyran-4-yloxy)-estra-1,3,5(10)-triene.

7. The compound selected from those of claim 3 wherein $R^6$ is methyl; 3-methoxy-17β-(tetrahydropyran-4-yloxy)-estra-1,3,5(10)-triene.

References Cited

UNITED STATES PATENTS 3,461,118    8/1969    Edwards _____ 260—239.55
3,525,740    8/1970    Cross et al. _____ 260—239.55

ELBERT L. ROBERTS, Primary Examiner

U.S. Cl. X.R.

424—241